(12) United States Patent
Nakayama et al.

(10) Patent No.: US 8,345,668 B2
(45) Date of Patent: Jan. 1, 2013

(54) VIDEO DELIVERING SYSTEM, VIDEO DELIVERING DEVICE, AND SYNCHRONIZATION CORRECTING DEVICE

(75) Inventors: Mariko Nakayama, Tokyo (JP); Toshiyuki Odaka, Fuchu (JP)

(73) Assignee: Hitachi, Ltd., Tokyo (JP)

( * ) Notice: Subject to any disclaimer, the term of this patent is extended or adjusted under 35 U.S.C. 154(b) by 423 days.

(21) Appl. No.: 12/689,291

(22) Filed: Jan. 19, 2010

(65) Prior Publication Data
US 2010/0183000 A1   Jul. 22, 2010

(30) Foreign Application Priority Data

Jan. 22, 2009  (JP) ................................. 2009-011869

(51) Int. Cl.
*H04L 12/66* (2006.01)
*G06F 15/16* (2006.01)
*G06F 15/173* (2006.01)

(52) U.S. Cl. ......... 370/352; 709/204; 709/223; 709/224
(58) Field of Classification Search .................. 370/352, 370/252, 328; 709/204, 220, 223, 224
See application file for complete search history.

(56) References Cited

U.S. PATENT DOCUMENTS

2008/0225735 A1* 9/2008 Qiu et al. ...................... 370/252
2009/0013356 A1* 1/2009 Doerr et al. ...................... 725/62

FOREIGN PATENT DOCUMENTS

JP  2001-197048 A  7/2001

* cited by examiner

*Primary Examiner* — Chandrahas Patel
*Assistant Examiner* — Stephanie Chang
(74) *Attorney, Agent, or Firm* — Mattingly & Malur, PC

(57) ABSTRACT

The video receiving device delivers reproducible video streams by synchronizing video images. The video delivering device determines the delivery time for each RTP packet based on the time information for plural video streams corresponding to plural contents, adds the determined delivery time (timestamp) to each RTP packet, and delivers RTP packets by using the counter common among plural contents. The video relaying device corrects the transfer timing for RTP packets based on the counter common among plural contents and the delivery time (timestamp) and sends them to the video receiving device. The video receiving device plays back the video images from the received RTP packets.

16 Claims, 16 Drawing Sheets

| STREAM ID 401 | TIMESTAMP 402 | PCR 403 | SEQUENCE NUMBER 404 |
|---|---|---|---|
| 239.255.255.1 | ×× | △△ | 1234 |
| 239.255.255.2 | ×× | △△ | 1244 |
| 239.255.255.3 | | | |

V: VERSION, P: PADDING
X: EXTENDED HEADER, CC: CSRC COUNT
M: MARKER, PT: PAYLOAD TYPE

NETWORK A

NETWORK A          NETWORK C
                   (PRIORITY CONTROL)

VIDEO DELIVERING SYSTEM, VIDEO DELIVERING DEVICE, AND SYNCHRONIZATION CORRECTING DEVICE

CLAIM OF PRIORITY

The present application claims priority from Japanese patent application JP2009-11869 filed on Jan. 22, 2009, the content of which is hereby incorporated by reference into this application.

BACKGROUND OF THE INVENTION

1. Field of the Invention

The present invention relates to a video delivering system that delivers video streams, and more particularly, to a technology to control the intervals of delivery of a plurality of video streams.

2. Description of the Related Art

The recent diffusion of network technology has led to the development of technology to send video streams by means of Internet Protocol (IP). The technology of sending video streams falls under two categories: one that delivers video streams in real time by means of IP multicasting, and one that downloads video streams and then plays back accumulated video data. Among the known systems for encoding video data is MPEG2 (Moving Picture Experts Group 2). Among the known systems for delivering video streams is RTP/UDP (Real-time Transport Protocol/User Datagram Protocol).

The increased bandwidth of communication lines permits delivery of plural video images. For example, live telecasting of sports (baseball) employs plural cameras, but the viewer cannot watch specific images he wants because only images selected by the broadcasting station from images of several cameras are delivered. However, if it is possible to deliver plural images at the same time (and hence to deliver images from all cameras), then the viewer will be able to watch several images at the same time or to select arbitrary images he wants. In the case of live telecasting of baseball, for example, the viewer will be able to watch the manager and other players while the pitcher is throwing a ball. In other words, the viewer will be able to watch several images of objects at the same time which cannot be taken by a single camera.

What is important in simultaneous delivery of plural images is synchronization of images. In the case of a transport stream of MPEG2, the reference time information to be used for decoding and display of video frames is generated for individual streams according to PCR (Program Clock Reference) contained in TS packets. Therefore, the delivery of plural streams through broad IP networks is subject to jitter caused by the network. Thus the timing (generated by clock) of each stream does not coincide with the rate of clock advancing, which results in discrepancy between the indicated timing and the start of image playback for each stream.

Also, in the case of an IP network, which does not guarantee the arrival of packets, there is a possibility that IP packets containing information required for clock generation are discarded in the network.

One method for synchronous playback of plural images is disclosed in Japanese Patent Laid-open Publication No. 2001-19704. This synchronizing system selects a stream (that functions as a master) from plural streams and decodes other streams by using the clock of the selected stream.

OBJECT AND SUMMARY OF THE INVENTION

The method described in the patent document given above can achieve synchronization among streams. However, if synchronization is to be achieved in the IP network that relays video data, it needs to check the payload of all IP packages and reconstruct the video data to achieve synchronization. This imposes a great processing load on the video relaying device. Also, in the case where the video receiving device (terminal) is to perform synchronization, it requires a buffer and processing capacity large enough to absorb the influence of jitter originating from the network.

It is an object of the present invention to provide a video delivering system, a video delivering device, and a synchronization correcting device, which permit a viewer to watch plural synchronized video images with a terminal having a small capacity of buffer or with a terminal having a low processing capacity, owing to correction of synchronization which is achieved by the relaying node on the network.

The gist of the present invention resides in a video delivering system composed of a video delivering device which sends more than one video stream at the same time and a video relaying device which transfers the video streams sent from the video delivering device to a video receiving device, wherein the video delivering device determines the time of sending video streams based on the time information of the video, adds the determined sending time to the video stream, and sends the video stream to the video relaying device by using the common time information to be used in common among the video streams, and said video relaying device transfers the video stream to the video receiving device by using the common time information to be used in common among the video streams based on the delivering time added to the received video stream.

The gist of the present invention resides also in a video delivering device composed of a processing unit and a memory unit and capable of delivering plural video streams containing time information, wherein the processing unit determines the time of sending video streams based on the time information for the video image, adds the determined sending time to the video stream, and controls to deliver plural streams by using the common time information to be used in common among plural streams to be delivered.

The gist of the present invention resides also in a synchronism correcting device which is composed of a receiving unit, a processing unit, and a memory unit and is capable of correcting synchronism for video streams which have been sent from the video delivering device that delivers plural video streams containing time information, wherein the receiving unit receives plural video streams which have been sent by using the common time information common among plural video streams to which is added the sending time determined based on the time information of the video image, and the processing unit corrects synchronism of plural video streams based on the sending time which has been added to plural video streams by using the common time information used in common among plural video streams.

In its preferred embodiment, the video delivering system according to the present invention works in such a way that the relaying device in the network corrects synchronism of plural streams delivered in the form of different IP streams and plural streams, whose synchronism has been corrected, are sent to the video receiving device connected to the relaying device, so that plural video streams are played back synchronously by the video receiving device.

A preferred way of operation is as follows. The time of delivery of RTP packets is determined based on the time information of contents. The video delivering device references the same counter for plural contents to be synchronized and delivers RTP packets of plural contents synchronously to the network. The video relaying device references the same counter for plural contents to be synchronized, corrects and reproduces the timing delivered synchronously by the video delivering device, and transfers them to the video receiving device.

The video delivering device determines the sending time (timing to deliver RTP packets) from PCR of each stream for synchronous delivery, and then it records it in the timestamp field of RTP packets. It also delivers RTP packets at the delivery timing previously determined by using the counter to be used in common among streams for synchronous delivery.

The video relaying device controls a set of streams which need correction of delivery timing and accumulates RTP packets which need correction of delivery timing. After having accumulated in the buffer as many RTP packets as necessary to absorb jitter in the network, it delivers RTP packets to the video receiving device at the delivery timing (which has been delivered by the video delivering device) by using the counter common with the streams that need correction of synchronization and also using the timestamp which is the delivering time given by the video delivering device. If the video relaying device finds that packets containing PCR have been discarded in the network, it generates PCR and delivers it to the video receiving device.

The video delivering system of the present invention eliminates the discrepancies of playback timing for individual streams that occur due to influence of jitter and packet loss in the network, and it delivers streams for which the video receiving device is capable of synchronous playback. It also permits plural video receiving devices connected to the relaying device to perform synchronous playback of plural video images because the relaying device on the network corrects synchronization.

BRIEF DESCRIPTION OF THE DRAWINGS

Exemplary embodiments of the present invention will be described in detail based on the following figures, wherein.

DESCRIPTION OF THE PREFERRED EMBODIMENTS

Some embodiments of the present invention will be described with reference to the accompanying drawings.

According to each embodiment of the present invention, the time information of contents is used as the reference to determine the delivery time of RTP packets. The video delivering device references the same counter for plural contents to be synchronized for the synchronous delivery to the network of RTP packets of plural contents. The video relaying device references the same counter for plural contents to be synchronized so as to correct the delivery timing synchronized by the video delivering device. It also transfers the corrected and reproduced contents to the video receiving device.

Embodiment 1

Figure 1:
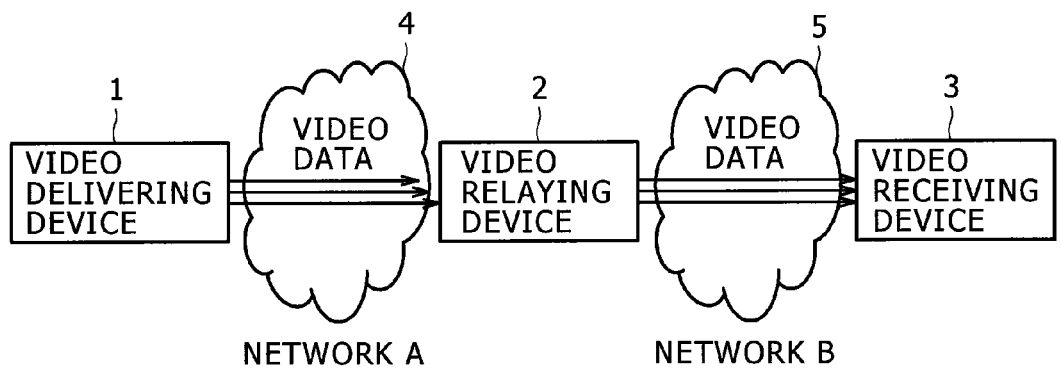
FIG. 1 is a diagram illustrating the configuration of the video delivering system according to Embodiment 1.

FIG. 1 is a diagram illustrating the configuration of the video delivering system according to Embodiment 1.

The video delivering system according to Embodiment 1 consists of the video delivering device 1, the video relaying device 2, the video receiving device (terminal) 3, the network A 4, and the network B 5.

The network A 4 connects the video delivering device 1 and the video relaying device 2 to each other. The network B 5 connects the video relaying device 2 and the video receiving device 3 to each other.

<Video Delivering Device>

The following is a description of the video delivering device according to Embodiment 1.

Figure 2:
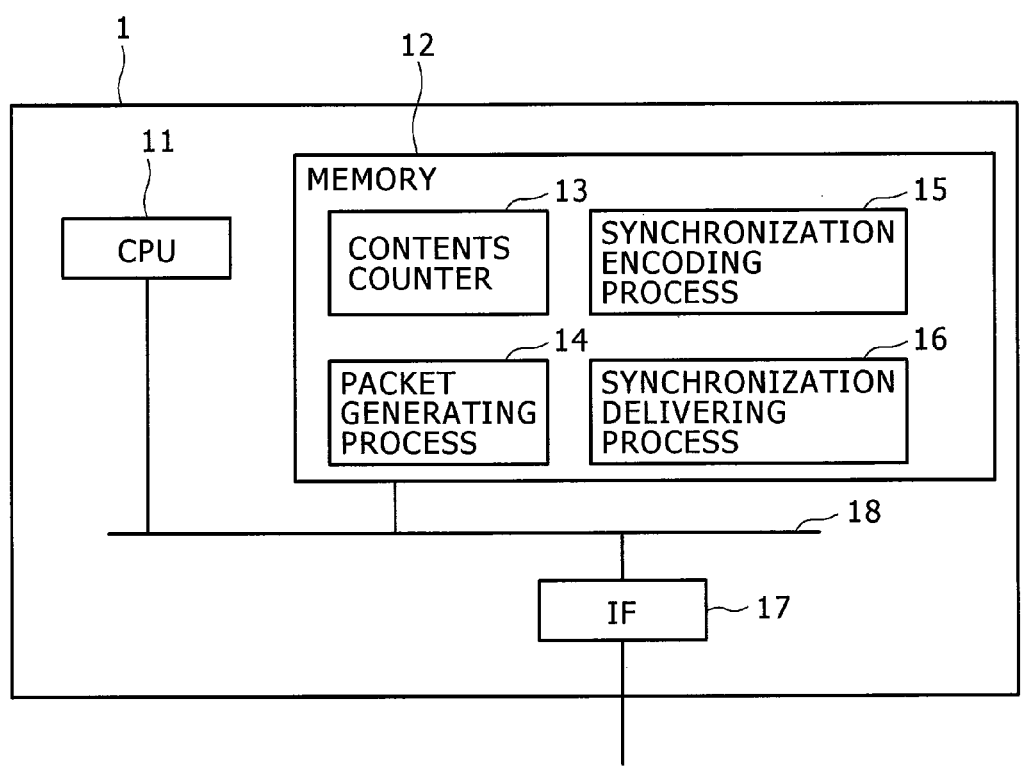
FIG. 2 is a block diagram illustrating the configuration of the video delivering device according to Embodiment 1.

FIG. 2 is a block diagram illustrating the configuration of the video delivering device 1 according to Embodiment 1.

The video delivering device 1 consists of the central processing unit (CPU) 11, which is a processing unit, the memory 12, which is a memory unit, and the interface (IF) 17, which constitutes a transmitting and receiving unit.

The CPU 11 executes the operating system (OS) and various application programs. The memory 12 stores various application programs to be executed by the CPU 11, which include the contents counter 13, the packet generating program 14, the synchronism encoding program 15, and the program for the synchronous delivering process 16. The CPU 11 and the memory 12 are connected to each other by the bus 18.

The contents counter 13 is a counter to be used in common for plural streams for synchronous delivery. It sends out the common timing information to be used in common for plural streams for synchronous delivery.

The synchronization encoding program 15 encodes contents for synchronous delivery into TS format of MPEG2 so that PCR coincides for all streams. This may be accomplished by synchronization encoding into TS format in real time, with the video delivering device 1 equipped with a video camera (not shown), or by re-encoding into TS format so that PCR coincides for all stream.

The packet generating program 14 performs the packing into RTP packets of the TS packets encoded by the synchronization encoding program 15, and then adds a timestamp as the transmitting time.

The synchronous delivery processing program 16 delivers plural streams in synchronism with one another by using the contents counter 13.

The interface 17 transmits data from the CPU 11 and the memory 12 to external devices through networks and also receives data from external devices. In FIG. 1, the interface 17 is connected to the network A 4.

<Video Relaying Device>

Figures 3, 4:
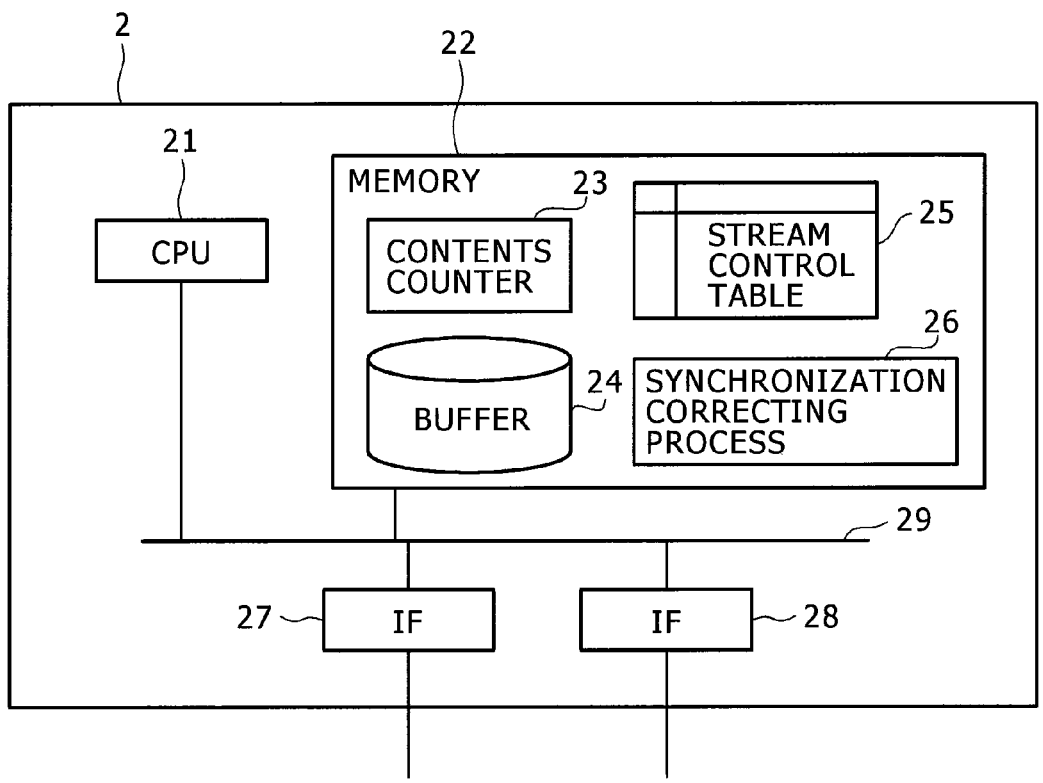
FIG. 3 is a block diagram illustrating the configuration of the video relaying device according to Embodiment 1.
FIG. 4 is a diagram illustrating the configuration of the stream control table according to Embodiment 1.

FIG. 3 is a block diagram illustrating the configuration of the video relaying device according to Embodiment 1. The video relaying device 2 consists of the CPU 21, the memory 22 for storage, and the interfaces (IF) 27 and 28 that constitute the transmitting and receiving devices. The memory 22 stores the contents counter 23, the buffer 24, the stream control table 25, and the synchronism correcting program 26. The CPU 21 and the memory 22 are connected to each other by the bus 29.

In this embodiment, the contents counter 23 is a counter to be used in common among plural streams for synchronous delivery, and it provides common time information to be used in common among plural streams for synchronous delivery. The buffer 24 stores RTP packets of streams requiring correction of synchronism. The stream control table is a table to control streams requiring correction of synchronism. The synchronism correcting program 26 corrects the delivery intervals of streams (which fluctuate after passage through the network A 4 which is an IP network) by means of the RTP timestamp and the common time information from the contents counter 23.

FIG. 4 is a diagram illustrating the configuration of the stream control table according to Embodiment 1.

The stream control table 25 contains the stream ID 401, the timestamp 402, the PCR 403, and the sequence number 404.

The stream ID 401 is an identifier (ID) to uniquely identify streams, which may be the IP address of a stream requiring correction of synchronism. It may additionally have the port number and the protocol type if it cannot uniquely identity streams in terms of IP address. The timestamp 402 is a field to record therein the timestamp of RTP containing PCR. The PCR 403 is a field to record therein the values of PCR contained in RTP packets. The sequence number 404 is a field to record therein the sequence number of RTP packets.

<Video Receiving Device>

Figure 5:
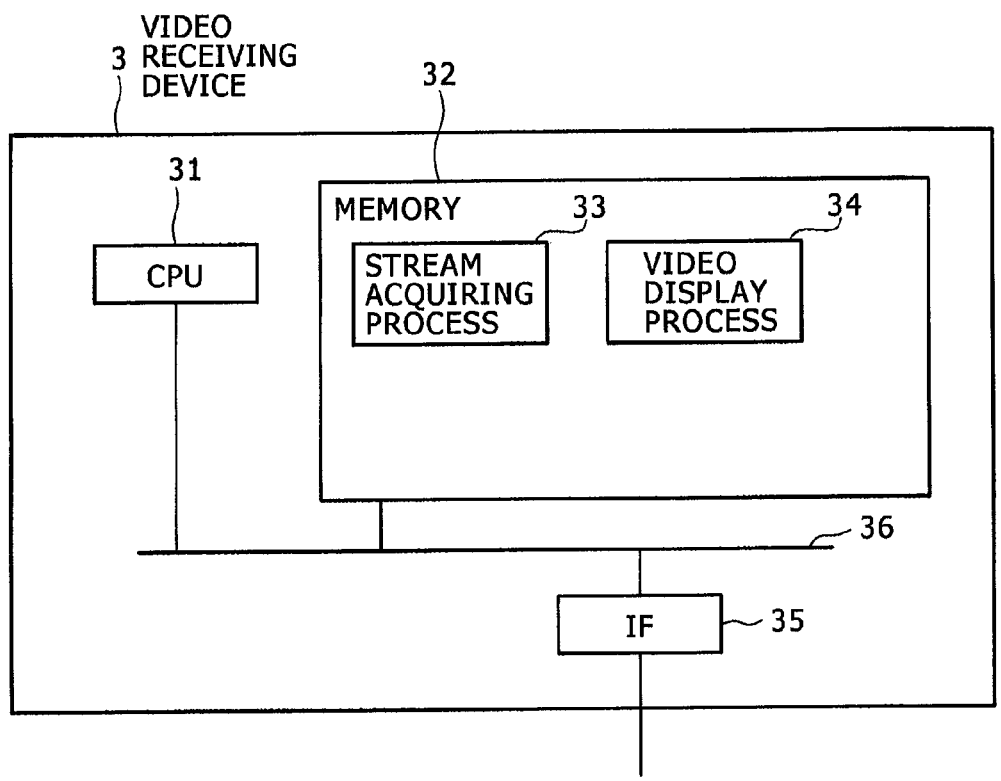
FIG. 5 is a block diagram illustrating the configuration of the video receiving device according to Embodiment 1.

FIG. 5 is a block diagram illustrating the configuration of the video receiving device (terminal) 3 according to Embodiment 1. The video receiving device 3 consists of the CPU 31, the memory 32, and the interface (IF) 35 that constitutes the transmitting and receiving devices.

The memory 32 stores the program for the stream acquiring process 33 and the program for the video displaying process 34, which are application programs to be executed by the CPU 31. The CPU 31 and the memory 32 are connected to each other by the bus 36.

The program for the stream acquiring process 33 receives RTP packets of video streams through the interface 35 so as to acquire video data. The program for the video displaying process 34 displays the acquired video data on the display screen of the display unit (not shown) of the video receiving device 3. Alternatively, it outputs the acquired video data in the form of signals that can be output to the display screen of a display device connected to the video receiving device 3.

Figure 6:
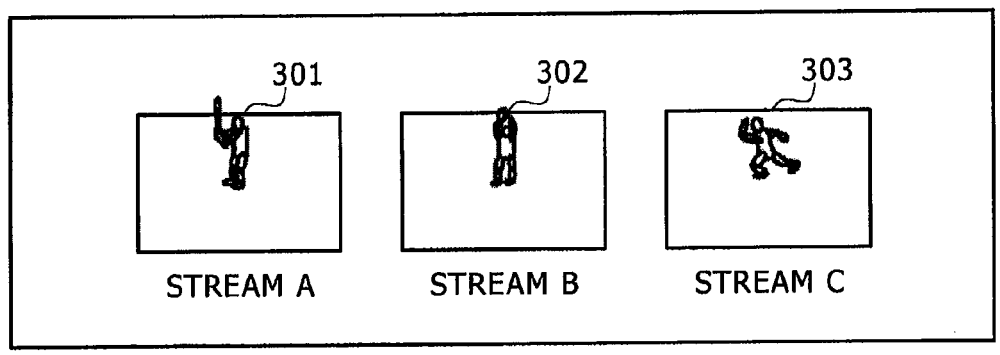
FIG. 6 is a diagram illustrating the video screen of the video receiving device according to Embodiment 1.

FIG. 6 is a diagram illustrating the video screen displayed by the stream displaying program 34. The video receiving device 3 is capable of displaying simultaneously plural video streams A 301, B 302, and C 303 which have been received. In the case of live telecasting of sports (baseball), it permits viewers to watch images of plural players (e.g., batter, pitcher, and runner).

<Processing According to Embodiment 1>

Processing according to Embodiment 1 and other embodiments is accomplished as each of the CPU 11, 21, and 31 in each device executes the program stored in each of the memory 12, 22, and 32. Incidentally, part or all of the processing may be accomplished by hardware logic rather than program.

Figure 7:
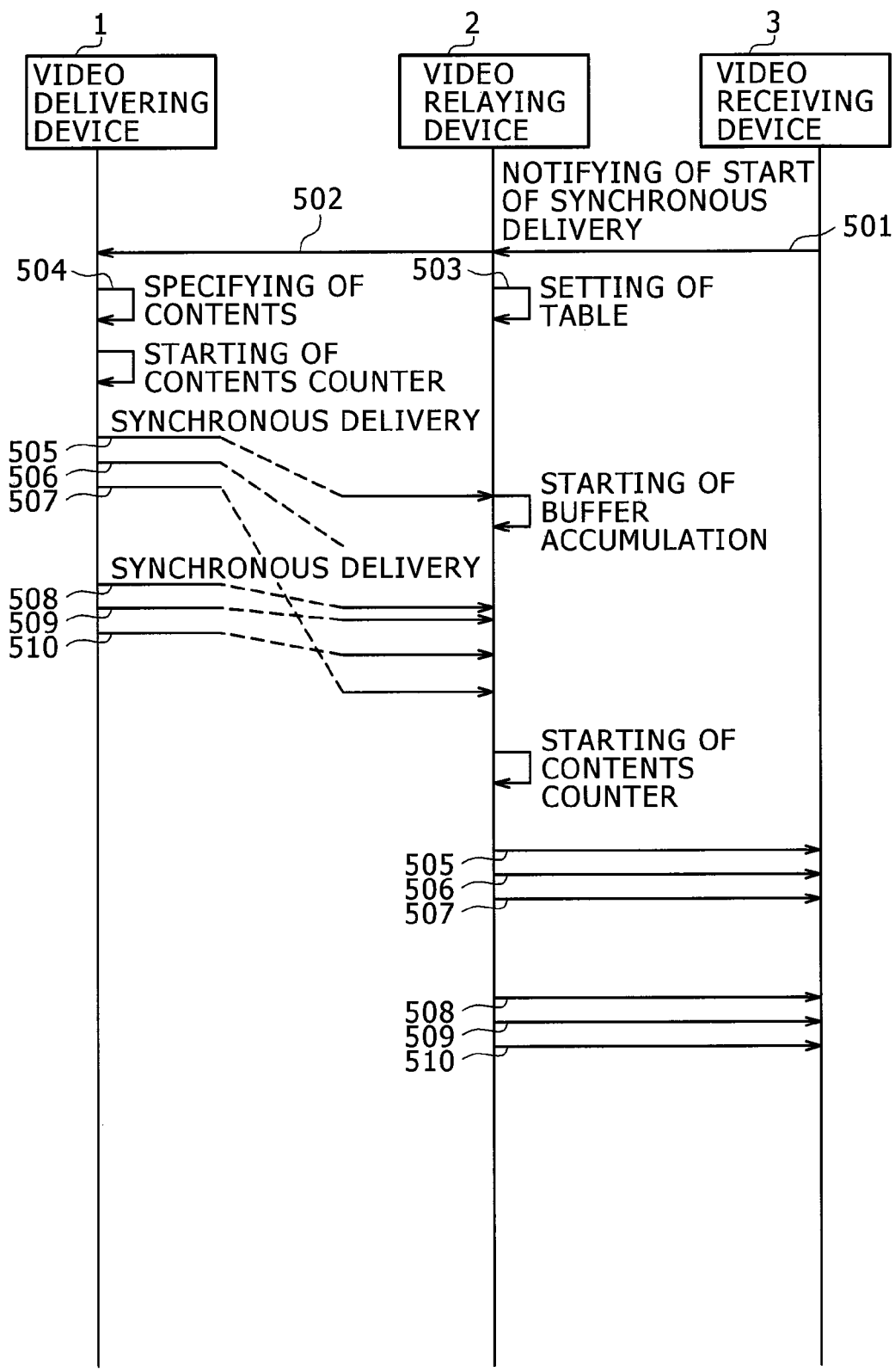
FIG. 7 is a sequence diagram for the synchronism correcting process according to Embodiment 1.

FIG. 7 is a sequence diagram for the synchronism correcting process for video streams.

The video receiving device (terminal) 3 notifies the video relaying device 2 that it has started synchronous delivery of multiviewpoint video (Step 501). This notification contains information (such as contents name) to specify contents for synchronous delivery and information to uniquely specify streams when the contents are delivered to the IP network. "Information to uniquely specify streams" denotes IP address, port number, etc. In other words, in the case where video streams are delivered by unicasting, the IP address and port number of the video receiving device 3 are notified. In the case of multicast delivery, the address of the multicast group is notified. Alternatively, notification from the video receiving device 3 may contain only information to specify contents and the video relaying device 2 may perform conversion into the address information based on the contents information.

The video relaying device 2 registers the ID of streams for synchronism correction with the stream control table 25 based on the information notified from the video receiving device 3 (Step 503). In this embodiment, the multicast address is used as the ID of streams. It also transfers to the video receiving device 1 the notification of start of delivery notified from the video receiving device 3 (Step 502).

The video delivering device 1 specifies the contents for delivery according to the information to specify contents which is contained in the notification of start of delivery (Step 504). It also activates the contents counter 13 and starts the synchronous delivery of streams to the IP address notified from the video receiving terminal 3.

Figure 10:
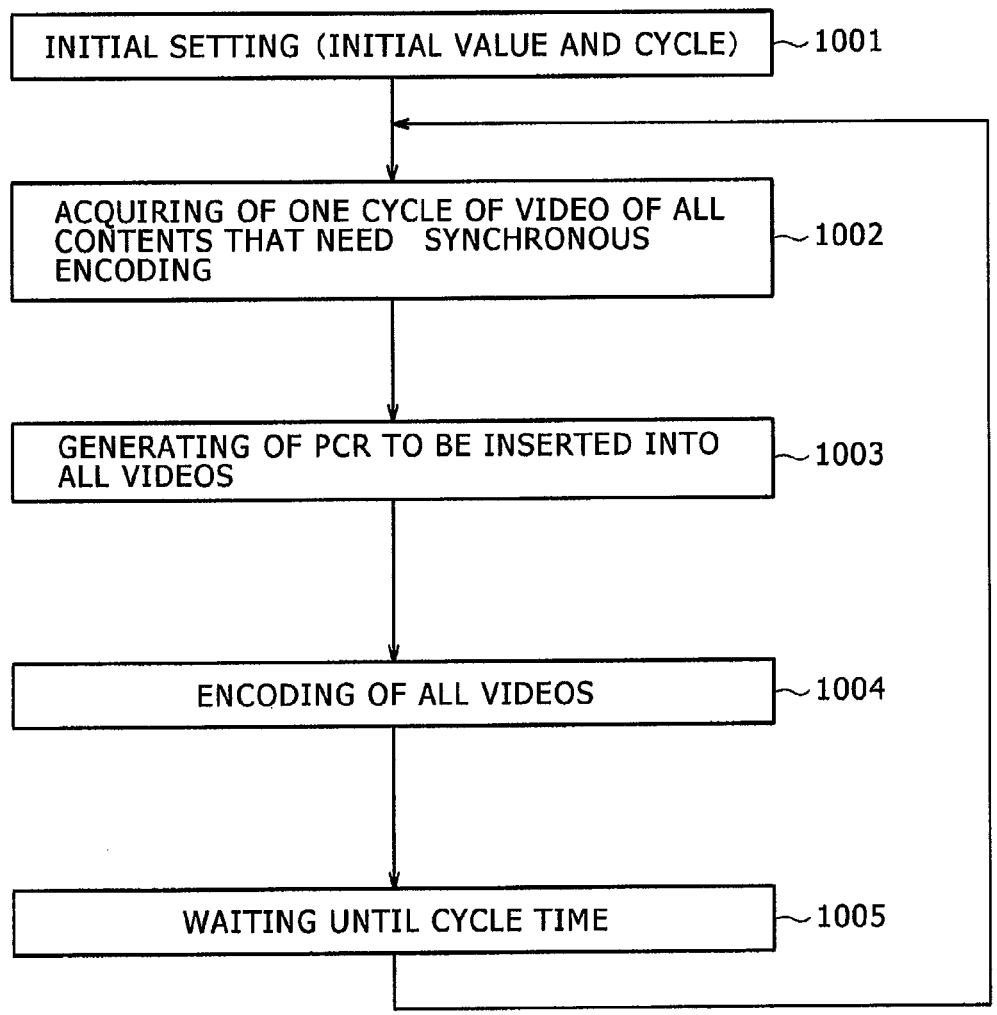
FIG. 10 is a flowchart of the synchronous encoding process according to Embodiment 1.

FIG. 10 is a flowchart illustrating one embodiment of the synchronism encoding process to be executed by the program for the synchronism encoding process 15 in the video delivering device 1 according to Embodiment 1.

After program start up, the program for the synchronism encoding process is initialized. To be specific, this is accomplished by establishing the cycle of insertion of PCR (or the intervals of appearance of PCR) and the initial value of PCR for all the contents to be encoded in synchronism and by starting the counter at 27 MHz (Step 1001).

The video delivering device 1 acquires images of all the contents that need synchronism encoding. The images to be acquired are those whose length is equal to one cycle determined in Step 1001 (Step 1002). Then, it determines, from the counter value which has been started in Step 1001, the value of PCR to be inserted into all the images, and generates TS packets containing PCR (Step 1003).

It sequentially encodes the images acquired in Step 1002 and generates TS packets (Step 1004). After completion of the foregoing process, it suspends processing and waits until a period of one cycle passes, or it repeats Steps 1002 to 1004 after a period of one cycle has passed (Step 1005), so that it encodes images of all the contents that need synchronism encoding.

The foregoing procedure permits encoding all the contents for synchronous delivery in such a way that the value of PCR coincides with the intervals of appearance.

Figure 8:
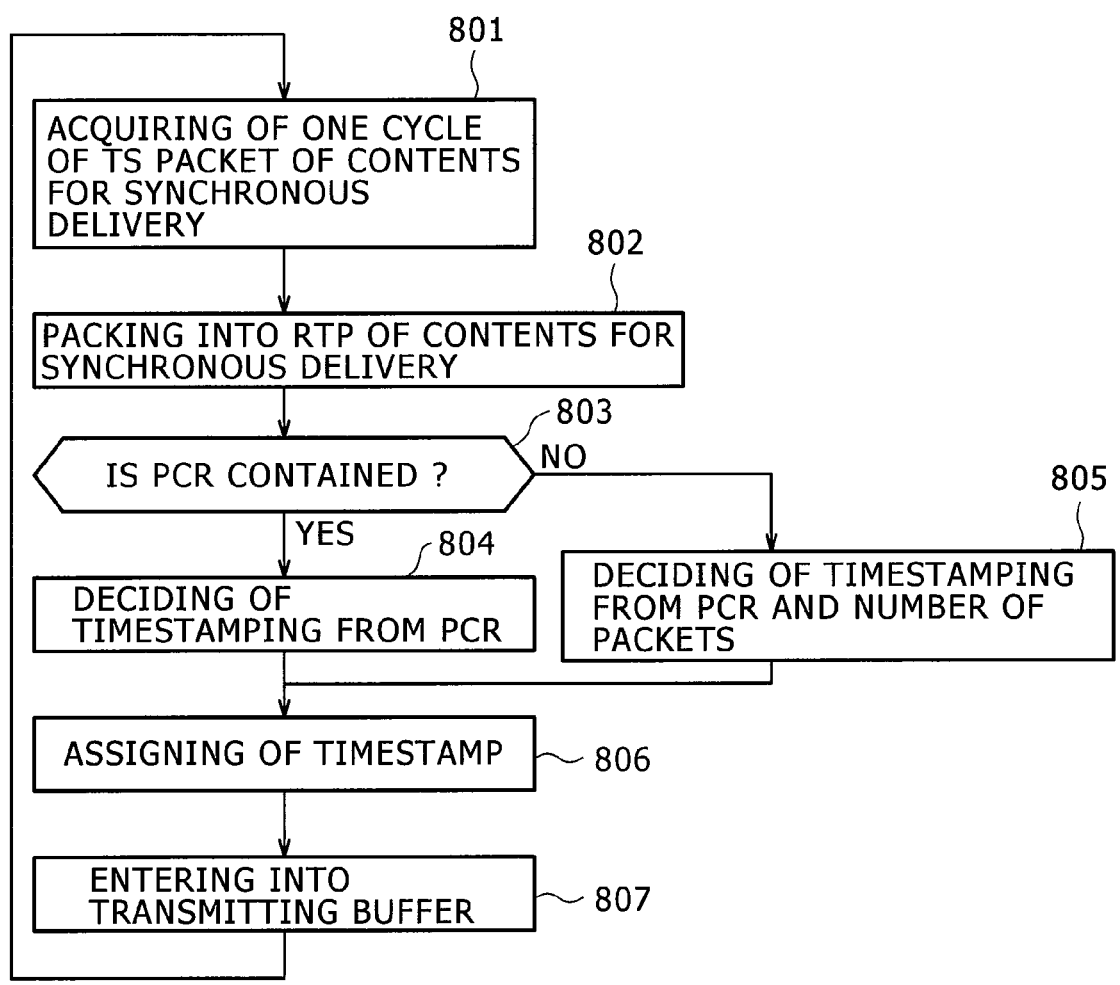
FIG. 8 is a flowchart of the packet generating process according to Embodiment 1.

FIG. 8 is a flowchart of the process for packet generation which is executed by the packet generating program 14 in the video delivering device 1 according to Embodiment 1.

The video delivering device 1 acquires one cycle of the first PCR to the next PCR for TS packets of all the contents for synchronous delivery (Step 801). It performs packing into RTP (Step 802). The maximum number of TS packets for one RTP packet is limited to 7 so that no fragments occur in the IP network.

It analyzes the RTP packets generated in Step 802. If TS packets containing PCR are packed in RTP packets (in the case of "YES" in Step 803), it calculates the timestamp as the delivery time to be given from PCR to the timestamp field of RTP (Step 804). The timestamp of RTP is the counter value of 90 kHz. Since PCR is the counter value of 27 MHz, the value obtained by dividing PCR by 300 is the timestamp of RTP.

On the other hand, if TS packets containing PCR are not packed (in the case of "NO" in Step 803), it determines the timestamp from the difference of PCR of one cycle and the number of packets contained in one cycle (Step 805).

That is, the difference between RTP packets is obtained by dividing the difference of PCR by the number of packets and further dividing the quotient by 300. Each time the sequence number of RTP is incremented, the timestamp is calculated by adding the difference of RTP packets to the timestamp calculated in Step 804.

In the case of encoding in timestamped TS packets, the timestamp of RTP may be calculated from the timestamp of the first TS packet of the TS packets packed in RTP.

Figure 11:
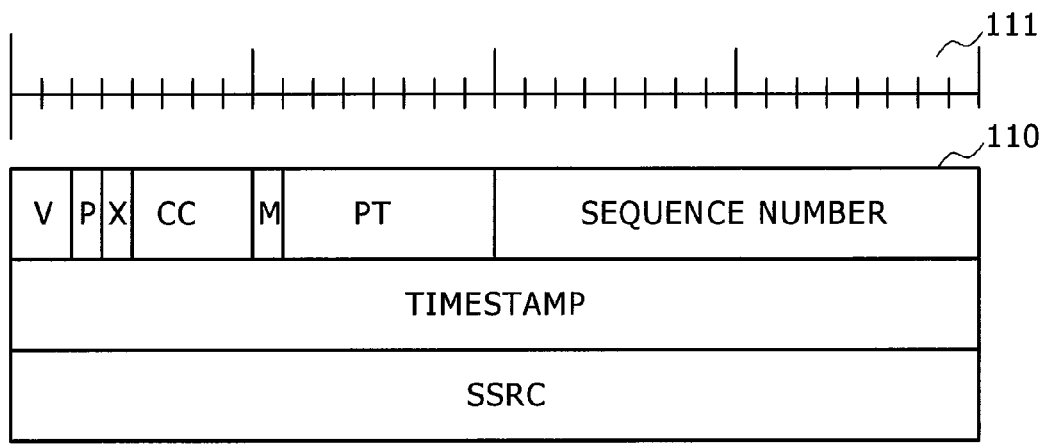
FIG. 11 is a diagram illustrating the configuration of the RTP header according to Embodiment 1.

FIG. 11 shows the configuration of the RTP header. The RTP header is indicated by 110. It has the bit structure indicated by 111. For example, the sequence number is composed of 16 bits (2 bytes). The timestamp field of RTP is the counter value of 90 kHz and hence the contents has a large amount of data; therefore, if timestamps with identical values are given to plural packets when the timestamp as the transmitting time is given with the counter of 90 kHz, it is possible to increase the counter accuracy and set up a field that stores a counter value higher than 90 kHz by the extended header.

Figure 12:
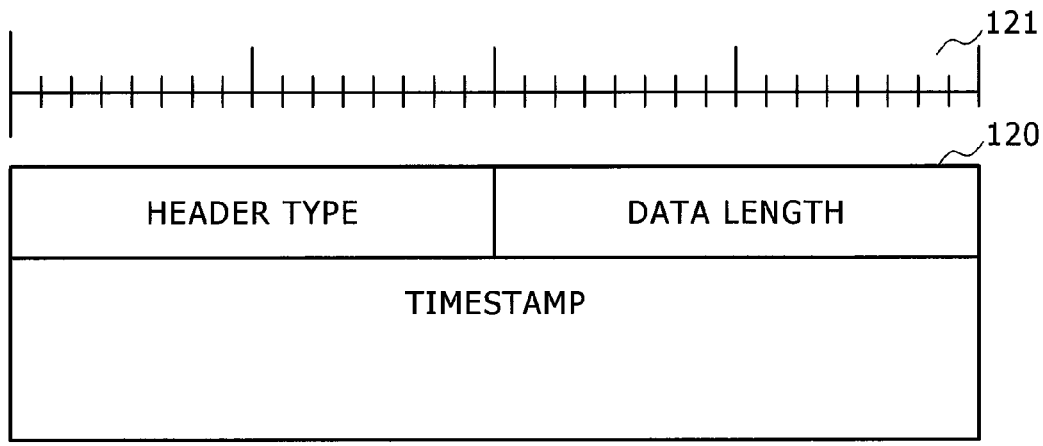
FIG. 12 is a diagram illustrating the configuration of the extended header according to Embodiment 1.

FIG. 12 shows the configuration of the timestamp field which has been newly defined by the extended header. The extended header is indicated by 120. The bit structure is indicated by 121.

Referring back to FIG. 8, the video delivering device 1 adds the calculated timestamp to the timestamp field of RTP (Step 806) and enters it into the buffer (not shown) for transmission (Step 807).

It repeats the foregoing process and determines the timestamp as the transmitting time of all RTP packets. It also performs the foregoing process for all the contents that need synchronism and generates RTP packets such that the timestamps of RTP packets containing the same PCR values coincide with one another.

Figure 9:
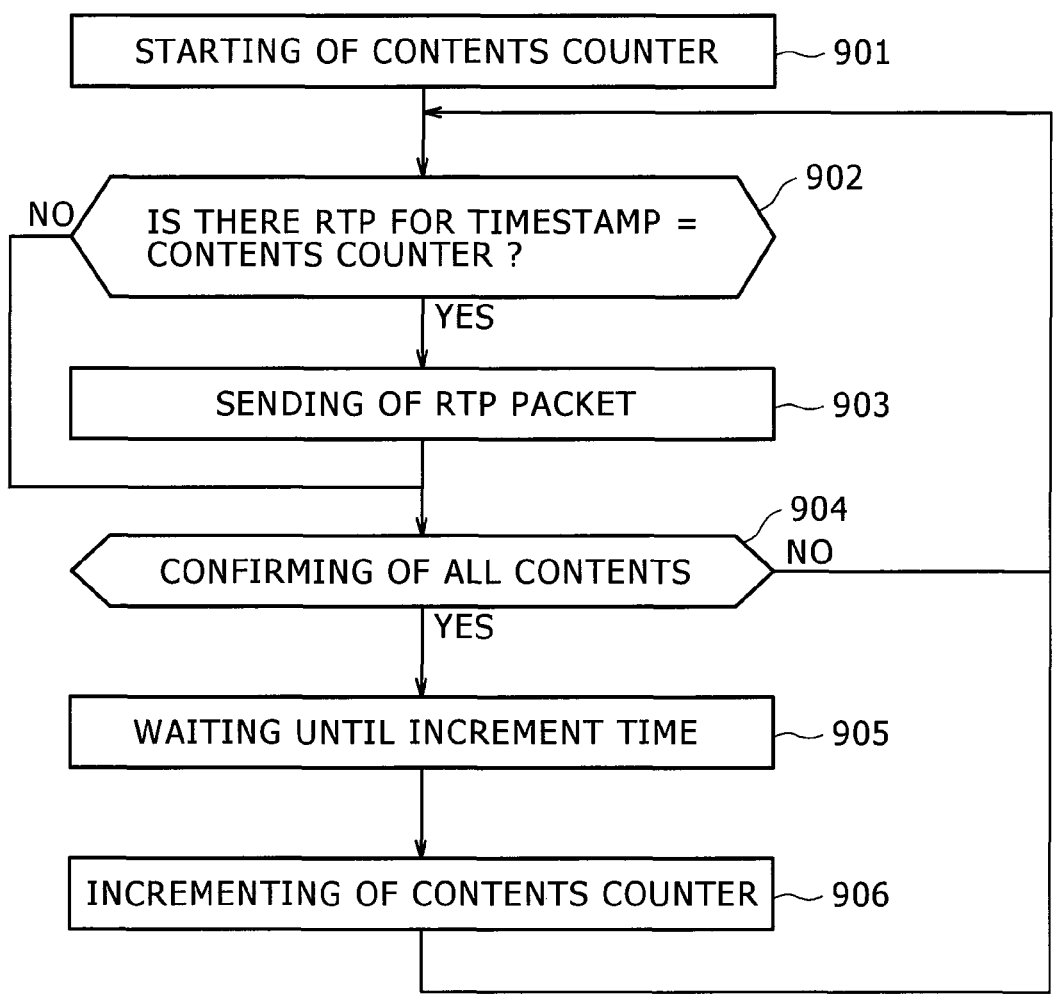
FIG. 9 is a flowchart for the synchronous delivery process according to Embodiment 1.

FIG. 9 is a flowchart of the synchronous delivering process to be executed by the program for the synchronous delivering process 16 in the video delivering device 1 according to Embodiment 1.

The program for the synchronous delivering process 16 confirms the timestamp (as the transmitting time of RTP packets) which has been generated by the program for the packet generating process 14, and then it delivers RTP packets to the IP network at adequate timing.

After a certain amount of RTP packets has accumulated in the transmission buffer, it initiates the contents counter 13 and starts synchronous delivery of plural streams (Step 901). The contents counter 13 uses the counter which is updated with the same frequency as the RTP timestamp. Therefore, in the case where the timestamp field defined by the extended header is used, the counter with the coinciding frequency should be used.

It inspects the transmission buffer and examines each stream for the value of the contents counter 13 to see if there are RTP packets whose timestamp coincides with the value of the RTP timestamp (Step 902). If there are RTP packets whose timestamp coincides with the contents counter 13 (in the case of "YES" in Step 902), it delivers that RTP packet to the network (Step 903). As the result of Step 903, RTP packets 505 to 507 shown in FIG. 7 are delivered to the network A 4.

It repeats the process in Steps 902 and 903 for all the contents for synchronous delivery (in the case of "NO" in Step 904). After comparison of all the contents is complete (in the case of "YES" in Step 904), it waits until the increment time of the contents counter 13 (Step 905). When the increment time has come, it increments the common time information of the contents counter 13 and then repeats the process of Steps 902 to 904 (Step 906). As the result of the foregoing steps, RTP packets 508 to 510 and other RTP packets (not shown) are delivered to the network A 4.

Figure 13:
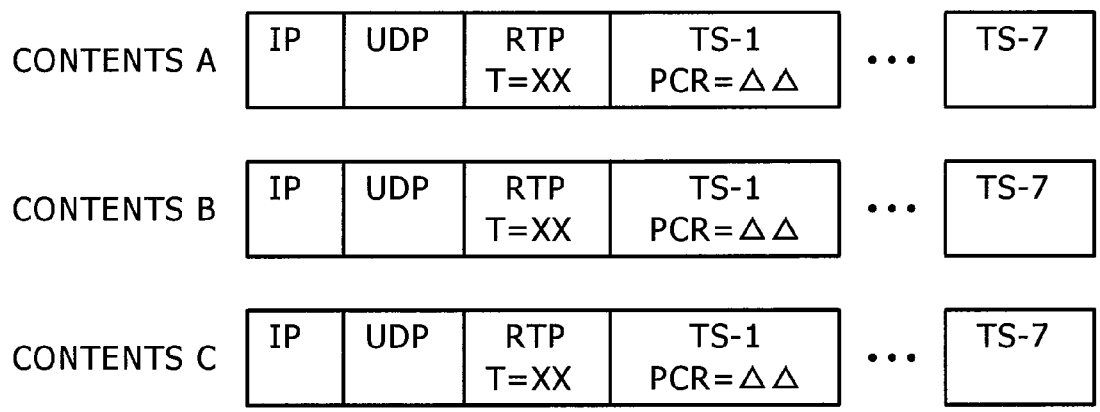
FIG. 13 is a diagram illustrating the configuration of the RTP packet to be delivered by the video delivering device according to Embodiment 1.

FIG. 13 shows the configuration of the RTP packet to be delivered to the network from the video delivering device 1 at a certain time. The program for the synchronous delivering process 16 gives the timestamp coinciding with the value of the contents counter 13 to the RTP packets of plural contents A, B, and C. And the RTP packets are sent to the network at the same time.

As a result of passage through the IP network, the RTP packets delivered from the video delivering device 1 reach the video relaying device 2 at timing different from that at which they were delivered from the video delivering device 1. There may be an instance in which the order of arrival of the RTP packets changes, the packets are discarded in the relay router (not shown), or the packets do not arrive at the video relaying device 2.

Figure 14:
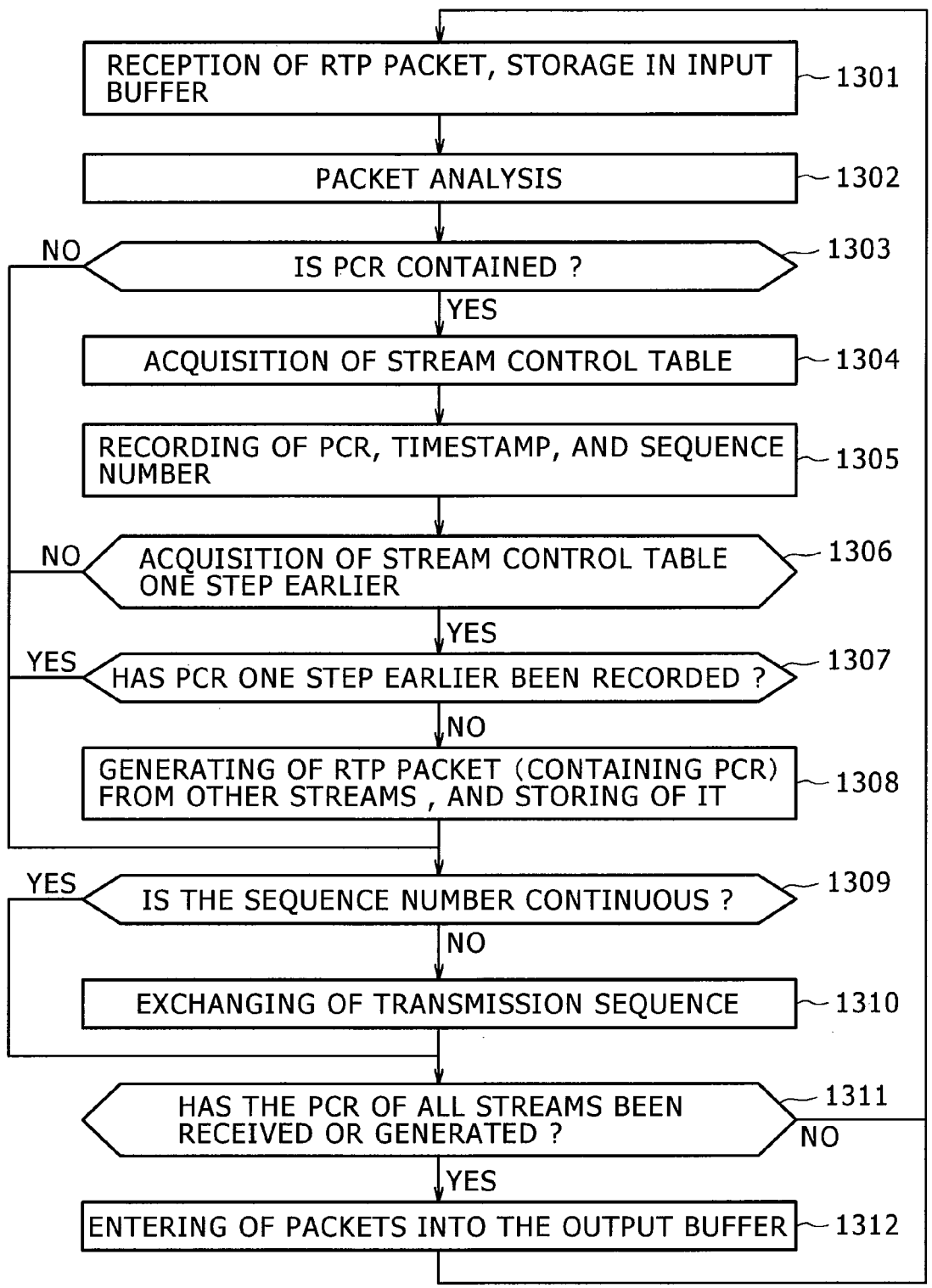
FIG. 14 is a flowchart of the synchronization correcting process at the input side according to Embodiment 1.

FIG. 14 is a flowchart of the synchronism correcting process at the time of packet reception in the input side, said process being executed by the program for the synchronism correcting process 26 in the video relaying device 2 according to Embodiment 1.

The video relaying device 2 receives the RTP packets and accumulates them in the buffer 24 (Step 1301). It analyzes the received RTP packets (Step 1302) and examines them to see if the RTP packets contain the PCR (Step 1303).

If PCR is not contained (in the case of "NO" in Step 1303), it executes Step 1309. On the other hand, if PCR is contained (in the case of "YES" in Step 1303), it acquires the stream control table 25 corresponding to the RTP packets received in Step 1301 (Step 1304) and records the value of the PCR in the PCR field 403. It also acquires the timestamp and the sequence number from the RTP header and records them in the timestamp field 402 and the sequence number field 404 of the stream control table 25 (Step 1305).

It acquires the stream control table precedent to the one which has been recorded in Step 1305 (Step 1306). Since the stream control table 25 is generated (or updated) each time the RTP packet containing PCR is received, there exists the precedent stream control table except immediately after the start of streaming. If it fails to acquire the precedent stream control table 25 immediately after the start of streaming (in the case of "NO" in Step 1306), it executes Step 1309. On the other hand, if it has acquired the precedent stream control table 25 (in the case of "YES" in Step 1306), it examines to see if PCR 403 of the relevant stream of the precedent stream control table 25 has been recorded (Step 1307).

If recording has been done (in the case of "YES" in Step 1307), it executes Step 1309. On the other hand, if recording has not been done (in the case of "NO" in Step 1307), it generates PCR precedent to the relevant stream from PCR 403 which has been recorded in other streams. Moreover, it generates RTP packets containing the generated PCR from the timestamp 402 recorded in other streams. The sequence number of the generated RTP packet is the one precedent to the first sequence number of the RTP packet of the relevant stream accumulated in the input buffer (Step 1308). Thus, the video relaying device 2 generates the PCR of the RTP packet which has been discarded in the IP network, as in the case of RTP packet 506, and delivers it to the video receiving device 3.

Then, it examines the relevant stream to see if the sequence numbers of the RTP packets accumulated in the input buffer is consecutive (Step 1309). If the reception order and the sequence number are replaced with each other (in the case of "NO" in Step 1309), it changes the sending order of RTP packets according to the order of the sequence number (Step 1310). Thus, the video relaying device 2 corrects the order of delivery of the RTP packets whose order has been altered from that at the time of delivery from the video delivering device 1.

When it has received or generated the PCR of all the streams controlled by the stream control table 25 (in the case of "YES" in Step 1311), it examines the input buffer for each stream, selects RTP packets before the sequence number 404 recorded in the stream control table 25 from among the accumulated RTP packets, and enters them into the output buffer (Step 1312).

By the foregoing procedure, it is possible to recover from the other stream information the packet containing PCR which has been discarded in the relaying router of the IP network, and it is also possible to correct the order of delivery of RTP packets.

Figure 15:
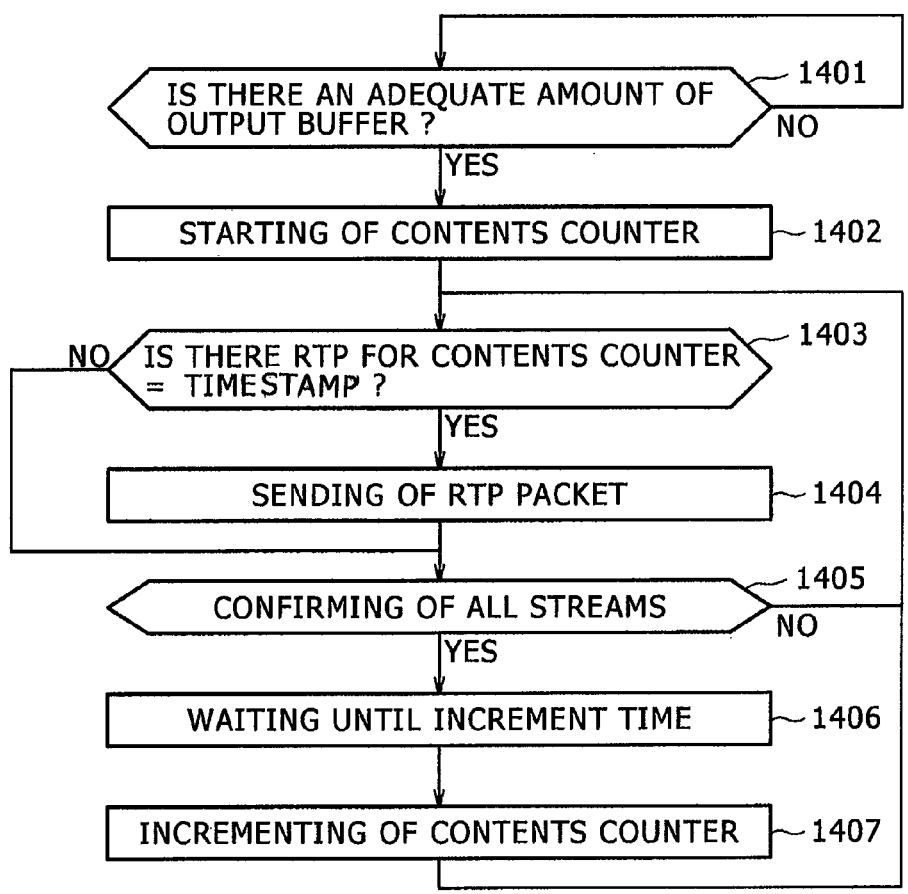
FIG. 15 is a flowchart of the synchronization correcting process at the output side according to Embodiment 1.

FIG. 15 is a flowchart of the synchronism correcting process to be executed (at the output side when packets are sent out) by the program for the synchronism correcting process 26 in the video relaying device 2 according to Embodiment 1.

The program for the synchronism correcting process at the output side examines the output buffer to see if RTP packets in an adequate amount have been accumulated in it (Step 1401). An adequate amount is a value established by the administrator of the video relaying device 2 in consideration of fluctuation in the network.

If RTP packets in an adequate amount have not been accumulated (in the case of "NO" in Step 1401), the step of examining the buffer is repeated. If it is found that RTP packets in an adequate amount have been accumulated (in the case of "YES" in Step 1401), the video relaying device 2 starts to deliver RTP packets from the output buffer.

First, it starts the contents counter 23 (Step 1402). The contents counter 23 is incremented by the same frequency as the counter used to give the timestamp to RTP.

It examines to see if there is an RTP packet whose timestamp value coincides with the value of the contents counter 23 (Step 1403). If not (in the case of "NO" in Step 1403), it executes Step 1405. If yes (in the case of "YES" in Step 1403), it sends the RTP packet to the network B 5 (Step 1404).

Steps 1403 to 1405 are repeated until all the streams that need correction of synchronism (which are registered in the stream ID 401 of the stream control table 25) have been examined.

After all the streams have been examined (in the case of "YES" in Step 1405), it waits until the incrementing time of the contents counter 23 (Step 1406), and at the incrementing time, it increments the contents counter 23 (Step 1407).

By the foregoing procedure, it is possible to reproduce the delivery timing of the video delivering device 1 by means of the video relaying device 2 which has the function of the synchronism correcting process.

Figure 16:
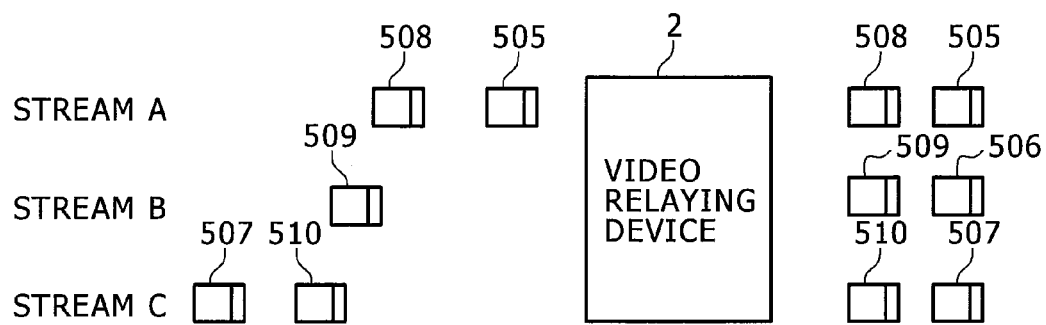
FIG. 16 is a diagram illustrating packets to be corrected by the synchronization correcting process according to Embodiment 1.

FIG. 16 shows how the video relaying device 2 according to this embodiment corrects the timing and order of delivery of RTP packets. The video relaying device 2 receives RTP packets 505, 508, 509, 510, and 507 sequentially but corrects their delivery timing by using the contents counter 23 and the timestamp of RTP, so that it is capable of delivering RTP packets in the order of 505, 506, 507, 508, 509, and 510. The RTP packet 506 has only the PCR information generated by the video relaying device 2 because it has been discarded in the network A 4.

Incidentally, Embodiment 1 employed MPEG2 for video encoding; however, it may be applied to all embodiments that employ any other video compression format.

As mentioned above, according to Embodiment 1, it is possible to reproduce the delivery timing and the order of delivery for the video delivering device by using the video relaying device and to achieve delivery to the video receiving device (terminal). Moreover, in the case where any packet which contains the time information to be used by the video receiving device is discarded in the network, the video relaying device reproduces the discarded packet so that it surely delivers the packet containing the time information to the video receiving device. Thus the video receiving device is capable of synchronous display of plural streams.

Embodiment 2

The following is a description of Embodiment 2.

This embodiment is concerned with a video delivering system which, in the case where those contents for which the video receiving terminal requires synchronous delivery are distributed among plural video delivering devices, delivers contents in synchronism with another video delivering system and permits the video relaying device to transfer them (after correction of synchronism) to the video receiving device (terminal).

Figure 17:
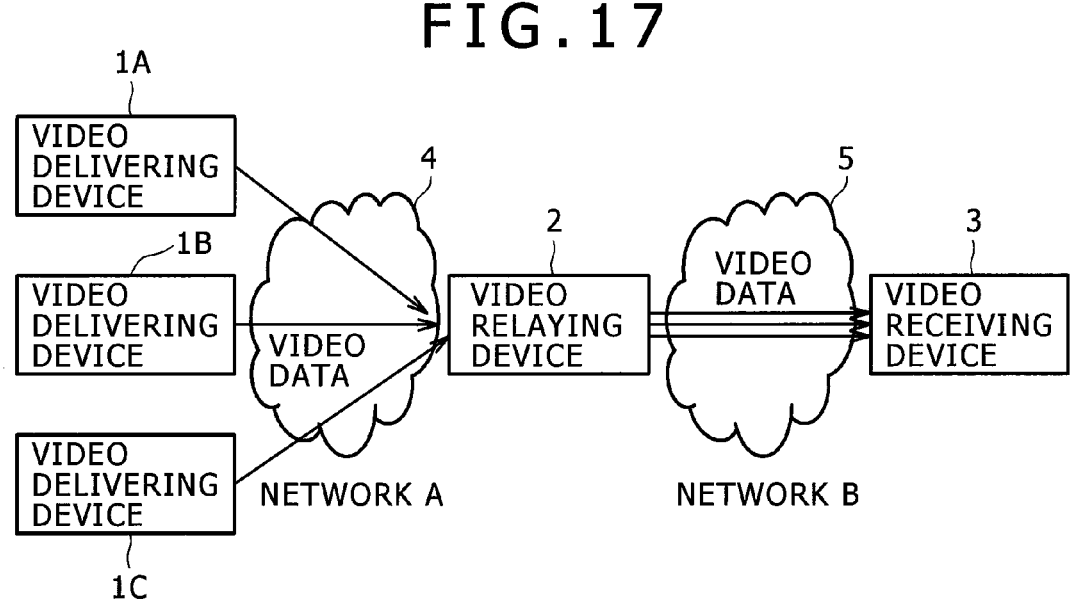
FIG. 17 is a diagram illustrating the configuration of the video delivering system according to Embodiment 2.

FIG. 17 is a diagram illustrating the configuration of the video delivering system according to Embodiment 2.

The video delivering system according to Embodiment 2 consists of the video delivering devices 1A, 1B, and 1C, the video relaying device 2, the video receiving device 3, and the network A 4 and network B 5.

The network A 4 connects the video delivering devices (1A, 1B, 1C) to the video relaying device 2. The network B 5 connects the video relaying device 2 to the video receiving device 3.

Figure 18:
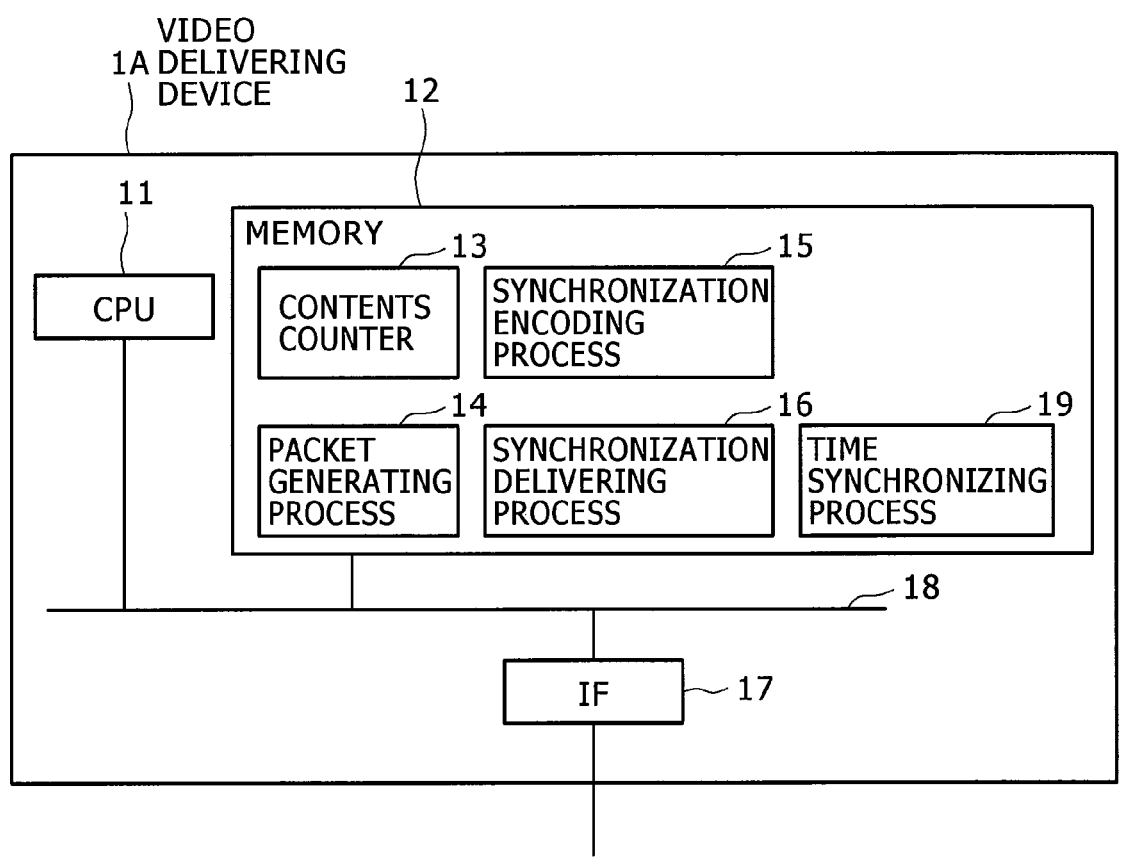
FIG. 18 is a block diagram illustrating the configuration of the video delivering device according to Embodiment 2.

FIG. 18 is a block diagram illustrating the configuration of the video delivering device 1A according to Embodiment 2. This configuration is common to the video delivering systems 1B and 1C.

The video delivering device 1A consists of the CPU 11, the memory 12, the interface 17, and the bus 18.

The CPU 11 executes the OS and various application programs. The memory 12 stores various application programs to be executed by the CPU 11, which include the contents counter 13, the packet generating program 14, the synchronism encoding program 15, the program for the synchronous delivering process 16, and the program for the time synchronizing process 19.

The program for the time synchronizing process 19 exchanges the time information relating to delivering time and encoding with other video delivering devices so as to synchronize the video delivery starting time with other video delivering devices. To be specific, it determines the time at which the program for the time synchronizing process 19 of the representative video delivering device starts video delivery and the time at which the program for the synchronism encoding process 15 starts encoding, the initial value of PCR to be used for encoding, and the intervals of appearance of PCR, and also gives instructions to the program for the time synchronizing process 19 of other video delivering devices.

Also, the program for the time synchronizing process 19 gives the initial value of the decided or instructed PCR and the intervals of appearance of PCR to the program for the synchronism encoding process 15. The program for the synchronism encoding process 15 performs encoding based on the given initial value of PCR and the interval of appearance of PCR. In this way it can perform encoding in such a way that the value of PCR coincides with the intervals of appearance of PCR for all the contents that need synchronous delivery even though the video delivering devices are distributed.

The processes to be executed by other programs are identical with those in Embodiment 1 mentioned above. It is assumed that the video delivering devices 1A, 1B, and 1C in Embodiment 2 hold time information in common which is supplied from GPS (Global Positioning System), radio-controlled watch, NTP (Network Time Protocol), etc.

Figure 19:
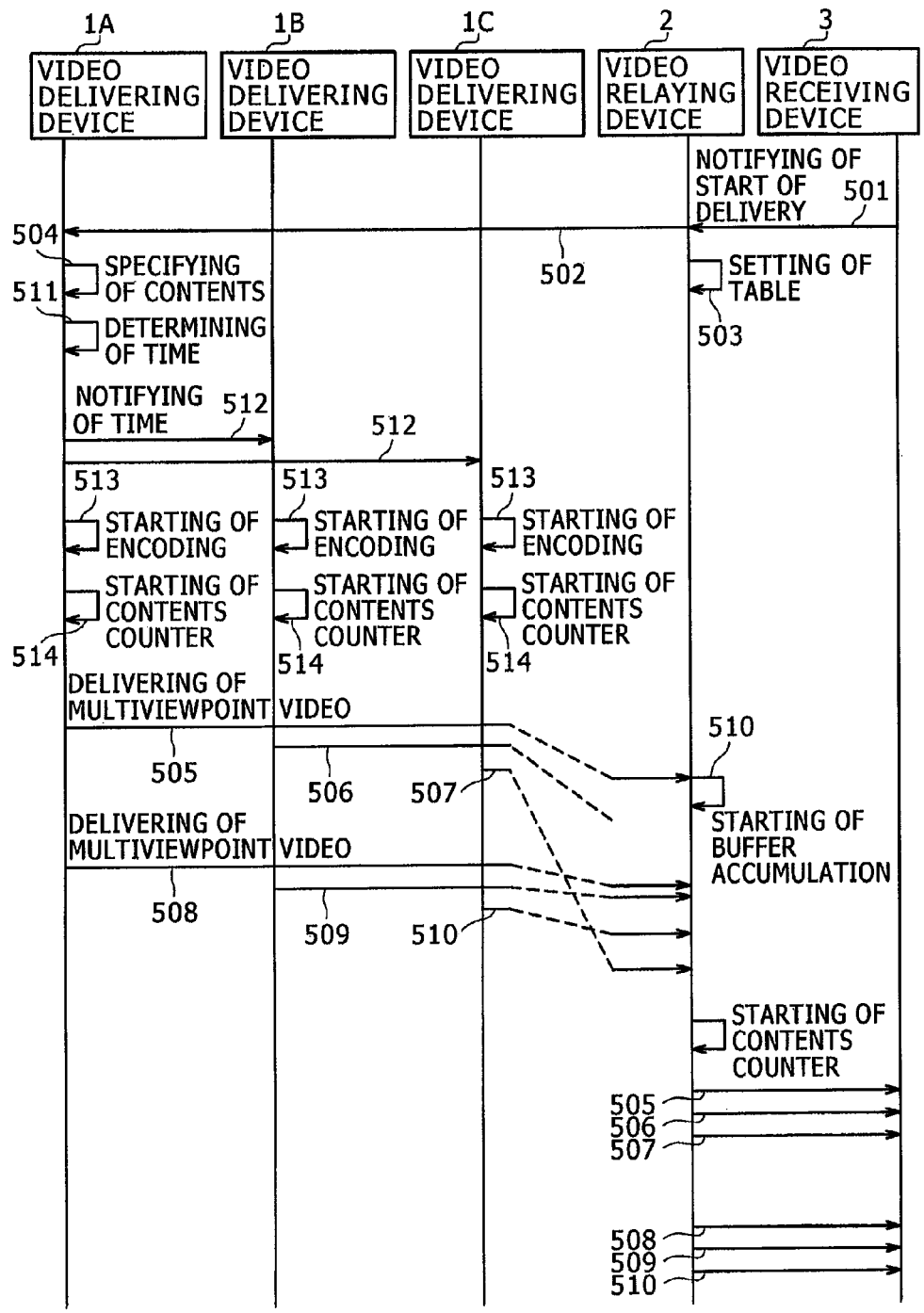
FIG. 19 is a sequence diagram for the synchronization correcting process according to Embodiment 2.

FIG. 19 is a sequence diagram for the process of correcting video stream synchronism according to Embodiment 2.

The video receiving device 3 sends the notification of start of synchronous delivery of multiviewpoint images to the video relaying device 2 (Step 501). This notification contains information (such as contents name) that specifies contents to be delivered in synchronism and also information that uniquely specifies streams when the contents are delivered to the IP network. "Information that uniquely specifies streams" means IP address, port number, etc. In other words, in the case where video streams are delivered by unicasting, it notifies the IP address and port number of the video receiving device 3. In the case of delivery by multicasting, it notifies the address of the multicasting group. The foregoing procedure may be modified such that the video receiving device 3 sends only information that specifies contents and the video relaying device 2 coverts the information of contents into the information of address.

The video relaying device 2 registers the ID of the streams that need synchronism correction with the stream control table 25 based on the information which has been notified by the video receiving device 3 (Step 503). In this embodiment, the multicasting address is used as the ID of the streams. It also transfers the notification of start of delivery sent from the video receiving device 3 to the video delivering device 1A (Step 502).

The video delivering device 1 specifies the contents to deliver and the position of the contents by using the information to specify contents which is contained in the notification of start of video delivery (Step 504). In the case where there exists the contents specified by the video receiving device 3 in the other video delivering device, it determines the time at which the other video delivering device starts the contents counter 13, the time at which the program for the synchronism encoding process 15 starts encoding, and the initial value of PCR to be used and the intervals of appearance of PCR (Step 511). Incidentally, in the case where the contents specified by the video receiving device 3 are the accumulated contents and are not the images taken by a video camera which are to be encoded and delivered in real time, it is not necessary to notify the time to start encoding.

It notifies the video delivering devices 1B and 1C of the time to start the contents counter, the time to start encoding, and the initial value of PCR and the intervals of appearance of PCR, which have been determined in Step 511 (Step 512). It also notifies the video delivering devices 1B and 1C of the IP address and port number at which the video receiving device 3 waits for the streams.

The program for the time synchronizing process 19 in the video delivering devices 1B and 1C which have received time notification sets up the notified starting time in the contents counter 13. It also sets up the time to start encoding and the initial value of PCR and the intervals of appearance of PCR in the program for the synchronism encoding process 15.

The video delivering devices 1A, 1B, and 1C start all at once encoding of contents from the time to start encoding which has been determined in Step 511 (Step 513). The program for the synchronism encoding process 15 in each delivering device utilizes the same initial value of PCR and the same intervals of appearance of PCR, so that it can perform encoding in such a way that the value of PCR and the interval of appearance of PCR are identical throughout all the contents even though the delivering devices are different from one another.

Also, the video delivering devices 1A, 1B, and 1C start all at once the contents counter 13 based on the time to start contents counter which has been determined in Step 511 (Step 514) and starts synchronous delivery of streams to the IP address notified from the video receiving device 3.

The packet generating process 14 and the synchronous delivering process 16 by each video delivering device are the same as those in Embodiment 1. Processes by the video relaying device 2 and the video receiving device 3 are the same as those in Embodiment 1.

As mentioned above, according to Embodiment 2, the video relaying device 2 corrects synchronism of streams and delivers streams to the video receiving device 3 even in the case where contents to be delivered in synchronism are accumulated or encoded in real time in plural distributed video delivering devices.

Embodiment 3

The following is a description of Embodiment 3.

This embodiment is concerned with the configuration of the video delivering system which does not have the video relaying device but has the video relaying function arranged in the video receiving device 203 and is capable of correcting synchronism of plural streams.

Figure 20:
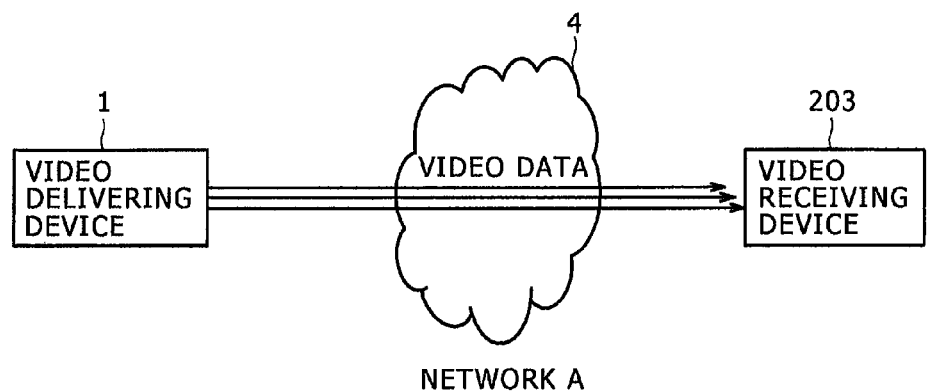
FIG. 20 is a diagram illustrating the configuration of the video delivering system according to Embodiment 3.

FIG. 20 is a diagram illustrating the configuration of the video delivering system according to Embodiment 3.

The video delivering system according to Embodiment 3 consists of the video delivering device 1, the video receiving device 203, and the network A4. The video receiving device 203 is connected directly to the network A4.

According to this embodiment, the video receiving device 203 has the function of correcting synchronism. The memory in it has not only the program for the stream acquiring process 33 and the program for the video displaying process 34 but also the contents counter 23, the buffer 24, the stream control table 25, and the program for the synchronism correcting process 26 all of which are contained in the video relaying device 2 in the case of Embodiment 1. These programs execute the same processing as in the case of Embodiment 1 mentioned above.

The video receiving device 203 directly notifies the video delivering device 1 of the start of synchronous delivery.

After being notified of the start of synchronous delivery, the video delivering device 1 performs the same processing as in Embodiment 1. The video delivering device 1 starts synchronous delivery of contents specified by the video receiving device 203.

The video receiving device 203 sets up the ID of the streams in the stream control table 25 and waits for streams from the video delivering device 1.

The video receiving device 203 receives RTP packets in which synchronism among streams has been disturbed due to influence of the IP network, and then it accumulates them in the buffer 24 in the same way as in the video relaying device 2 according to Embodiment 1. It starts the contents counter 23 and executes the program for the synchronism correcting process 26, thereby correcting synchronism of streams. It transfers the RTP packets, which have synchronism corrected, to the program for the stream acquiring process 33. The program for the stream acquiring process 33 acquires video data from the RTP packets and transfers them to the program for the video displaying process 34. The program for the video displaying process 34 displays the acquired video data on the screen.

As mentioned above, Embodiment 3 is characterized in that the video receiving device 203 has the synchronism correcting function which is contained in the video relaying device in the case of Embodiments 1 and 2. This configuration makes it possible to correct synchronism for plural streams in the video delivering system which is not provided with the video relaying device.

Embodiment 4

The following is a description of Embodiment 4.

Figure 21:
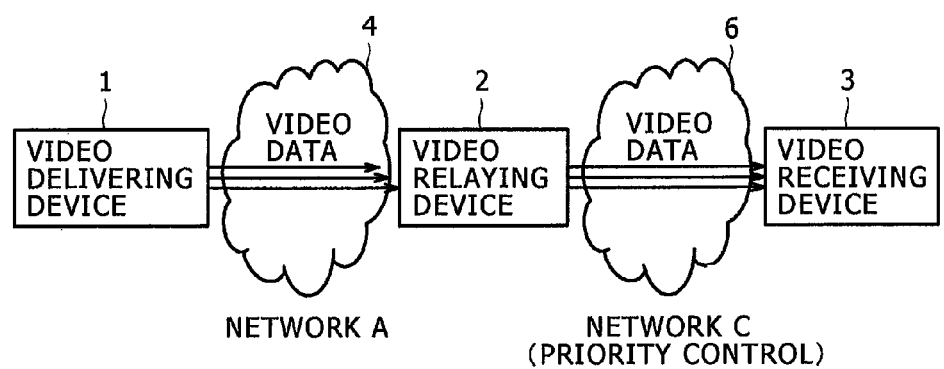
FIG. 21 is a diagram illustrating the configuration of the video delivering system according to Embodiment 4.

FIG. 21 is a diagram illustrating the configuration of the video delivering system according to Embodiment 4.

The video delivering system according to Embodiment 4 consists of the video delivering device 1, the video relaying device 2, the video receiving device 3, the network A 4, and the network C 6. The network C 6 is composed of routers capable of priority control, so that it preferentially transfers those IP packets which have DSCP fields (TOS fields) of IP header or traffic class fields.

The network A 4 connects the video delivering device 1 and the video relaying device 2 to each other. The network C 6 connects the video relaying device 2 and the video receiving device 3 to each other.

According to Embodiment 4, the video receiving device 3 notifies the video relaying device 2 of the start of synchronous delivery. Upon receipt of the notification of start of synchronous delivery, the video relaying device 2 performs the same processing as in Embodiment 1, and then it transfers the notification of start of synchronous delivery to the video delivering device 1. The video delivering device 1 starts to deliver synchronized streams in the same way as in Embodiment 1.

Upon receipt of RTP packets delivered from the video delivering device 1, the video relaying device 2 executes the program for the synchronism correcting process 26. Upon receipt of RTP packets, the video relaying device 2 accumulates them in the buffer 24 (Step 1301). It analyzes the received RTP packets (Step 1302) and examines them to see if PCR is contained in them (Step 1303).

If PCR is not contained (in the case of "NO" in Step 1303), it executes Step 1309. On the other hand, if PCR is contained (in the case of "YES" in Step 1303), it acquires the stream control table 25 relevant to RTP packets acquired in Step 1301 (Step 1304) and sets a value (e.g., 64) (which indicates the priority recipient) in the DSCP field of the IP header that contains the received RTP packet. Processes after Step 1305 are the same as those in Embodiment 1. Among RTP packets sent from the video relaying device 2, the one containing PCR is transferred preferentially through the network C 6 capable of priority control. The network C 6 capable of priority control refers to the DSCP field of the IP header and transfers the IP packets having a higher value in preference to other IP packets. In this way it is possible to prevent IP packets containing PCR from jitter.

As mentioned above, Embodiment 4 is characterized in that the video relaying device 2 sets the priority of IP packets containing PCR higher than those containing no PCR, so that it delivers IP packets containing PCR to the video receiving device 3 surely with a minimum of jitter.

Embodiment 5

The following is a description of Embodiment 5.

Figure 22:
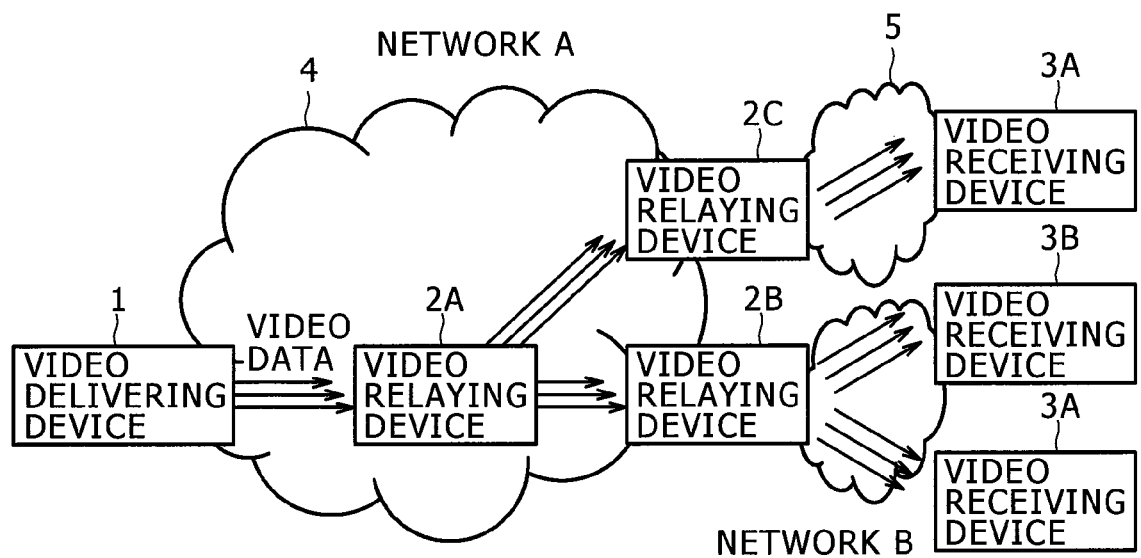
FIG. 22 is a diagram illustrating the configuration of the video delivering system according to Embodiment 5.

FIG. 22 is a diagram illustrating the configuration of the video delivering system according to Embodiment 5.

According to Embodiment 5, the video delivering system consists of the video delivering device 1, the video relaying devices 2A, 2B, and 2V, the video receiving devices 3A, 3B, and 3C, and the network A 4 and network B 5. The network A 4 connects the video delivering device 1 to the video relaying devices 2A, 2B, and 2C. The network B 5 connects the video relaying devices 2B and 2C to the video receiving devices 3A, 3B, and 3C.

It is assumed in Embodiment 5 that plural streams are delivered by multicasting from the video delivering device 1. In order that common streams are delivered to all of the video receiving devices 3A, 3B, and 3C, the setting of table (503) and the specifying of contents (504), which are performed in response to the notification of start of video delivery (501) from the video receiving device, are to be performed previously. In the case of delivery by unicasting, the video relaying device 2A duplicates packets and delivers them to the video relaying devices 2B and 2C.

The video delivering device 1 delivers plural streams in synchronism with one another in the same way as in Embodiment 1. Upon receipt of RTP packets delivered from the video delivering device 1, the video relaying device 2A corrects the transfer timing of RTP packets in the same way as in Embodiment 1, and transfers them to other video relaying devices (2B and 2C). Upon receipt of RTP packets delivered from the video relaying device 2A, the video relaying devices 2B and 2C correct the transfer timing of RTP packets in the same way as the video relaying device 2A, and transfer them to the video receiving devices 3A, 3B, and 3C.

As mentioned above, Embodiment 5 is characterized in that more than one video relaying device 2 are arranged in the network which corrects delivery timing frequently so as to minimize deviation of playback timing between video receiving devices close to one another in the network.

The present invention provides a technology useful to control intervals of delivery between plural video streams in the video delivering system to deliver video streams.

What is claimed is:

1. A video delivering system comprising:
a video delivering device which sends more than one video stream at the same time; and
a video relaying device which transfers the received video streams sent from the video delivering device to a video receiving device,
wherein the video delivering device determines a respective delivery time of one or more of the video streams based on time information of a video image therein, adds the respective delivery time to the one or more of the video streams, and sends the video streams to the video relaying device according to common time information common to the video streams,
wherein said video relaying device transfers the received video streams to the video receiving device according to the common time information and the respective delivery time added to the one or more of the received video streams, and
wherein the video relaying device has a memory unit which records the received video streams containing the time information for the video image and the delivery time added to the one or more of the video streams, when the video streams containing the time information for the video image are received, and detects that another one of the video streams containing the time information for the video image that is sent from the video delivering device has been discarded by knowing the respective delivery time added to the one or more of the video streams.

2. The video delivering system as defined in claim 1, wherein the video delivering device delivers at the same time a plurality of the video streams containing the same time information for video image.

3. The video delivering system as defined in claim 1, wherein the video streams are transport streams of MPEG2 (Moving Picture Experts Group 2) and the time information of the video image is a PCR (Program Clock Reference) contained in the transport stream.

4. The video delivering system as defined in claim 1, wherein the video delivering device encodes the video streams, so that the time information of the video streams to be sent at the same time coincide.

5. The video delivering system as defined in claim 1, wherein the video streams are composed of RTP (Real-time Transport Protocol) packets, the video relaying device has a memory unit which records therein the video streams containing the time information for video image and the delivery time added to the one or more of the video streams, and, upon detecting that the RTP packets containing the time information for the video image have been discarded by knowing from the delivery time added to the one or more of the video streams, generates and transfers RTP packets containing the time information for the discarded video image by knowing the time information for the video image contained in the one of more of the video streams.

6. The video delivering system as defined in claim 5, wherein the video relaying device transfers the generated RTP packets at the same time together with the RTP packets of the other video streams containing the same time information for video image.

7. A synchronism correcting device to correct synchronism for a plurality of video streams which have been sent from a video delivering device that delivers the plurality of video streams containing time information, comprising:
a receiving unit, a processing unit, and a memory unit,
wherein the receiving unit receives more than one of the plurality of video streams which have been sent according to common time information common to the plurality of video streams to which is added a delivery time determined based on time information of a video image of one of the more than one video steams, and the processing unit corrects synchronism of the more than one of the plurality of video streams based on the delivery time which has been added to the one of the more than one video streams according to the common time information common to the plurality of video streams, and
wherein the memory unit stores the more than one of the plurality of video streams containing the time information of the video image and the delivery time added to the one of the more than one of the video streams containing the time information for the video image, and the processing unit detects that another one of the more than one video streams containing the time information for the video image has been discarded by knowing the respective delivery time added to the one of the more than one of the video streams.

8. The synchronism correcting device as defined in claim 7, wherein the video images are transport streams of MPEG2 and the time information for video image is PCR contained in the transport stream.

9. The synchronism correcting device as defined in claim 7, wherein the video streams are RTP packets, and the processing unit, which, upon detecting that the RTP packets of the another one of the more than one video streams containing the time information for the video image has been discarded, newly generates RTP packets containing the time information for the discarded video image by knowing the time information for the video image contained in the one of the more than one of the video streams.

10. The synchronism correcting device as defined in claim 9, wherein the synchronism correcting device is a video relaying device to transfer the video image to the video receiving device and the processing unit performs control to transfer the newly generated RTP packets at the same time as the RTP packets for the more than one of the video streams containing the time information for the video image.

11. The synchronism correcting device as defined in claim 7, wherein the synchronism correcting device is a video receiving device to receive the video image, and the video receiving device plays back the more than one of the video streams with synchronism corrected.

12. The video delivering system as defined in claim 1, wherein the memory unit of the video relaying device contains a stream control table which records the video streams containing the time information for the video image and the delivery time added to the video streams, and
when the video relaying device receives the video streams containing the time information for the video image, the time information for the video image thereof is recorded in the stream control table.

13. The video delivering system as defined in claim 12, wherein, when the video relaying device receives the one or more of the video streams containing the time information for the video image, the video relaying device refers to the stream control table, and if the time information for the video image of a previous video stream which is prior to the one or more of the video streams is not recorded in the stream control table, the video relaying device determines that the previous video stream is discarded.

14. The video delivering system as defined in claim 13, wherein when the video relaying device determines that the previous video stream is discarded, the video relaying device generates time information for a previous video image of the previous video stream based from the time information for the video image of one or more of the video streams recorded in the stream control table.

15. The synchronism correcting device as defined in claim 7, wherein the memory unit contains a stream control table which records the video streams containing the time information for the video image and the delivery time added to the one or more of the video streams, and when the video relaying device receives the video streams containing the time information for the video image, the time information for the video image thereof is recorded in the stream control table.

16. The synchronism correcting device as defined in claim 15, wherein, when the receiving unit receives the one or more of the video streams containing the time information for the video image, the processing unit refers to the stream control table, and if the time information for the video image of a previous video stream prior to the video stream is not recorded in the stream control table, the processing unit determines that the previous video stream is discarded.

* * * * *